(12) United States Patent
Morgan et al.

(10) Patent No.: US 8,607,583 B2
(45) Date of Patent: Dec. 17, 2013

(54) COMBINATION DEHYDRATOR, DRY RETURN AIR AND CONDENSED WATER GENERATOR/DISPENSER

(75) Inventors: Michael Morgan, Dripping Springs, TX (US); Janet S. Morgan, Dripping Springs, TX (US)

(73) Assignee: H2OLiquidair of Florida, LLC, Homestead, FL (US)

( * ) Notice: Subject to any disclaimer, the term of this patent is extended or adjusted under 35 U.S.C. 154(b) by 81 days.

(21) Appl. No.: 13/252,132

(22) Filed: Oct. 3, 2011

(65) Prior Publication Data

US 2012/0048119 A1 Mar. 1, 2012

Related U.S. Application Data (63) Continuation of application No. 11/150,909, filed on Jun. 13, 2005, now Pat. No. 8,028,536, and a continuation-in-part of application No. 10/167,966, filed on Jun. 10, 2002, now Pat. No. 6,931,756.

(60) Provisional application No. 60/582,304, filed on Jun. 24, 2004, provisional application No. 60/296,472, filed on Jun. 8, 2001.

(51) Int. Cl.
*F25D 21/00* (2006.01)

(52) U.S. Cl.
USPC ............................................. 62/272; 62/389

(58) Field of Classification Search
USPC .............. 62/92, 272, 391, 389, 264; 165/222, 165/225
See application file for complete search history.

(56) References Cited

U.S. PATENT DOCUMENTS

| | | | |
|---|---|---|---|
| 2,799,145 A | 7/1957 | Jansen | |
| 2,805,560 A | 9/1957 | Beresford | |
| 2,996,897 A | 8/1961 | Grimes | |
| 3,035,418 A | 5/1962 | Wright | |
| 3,289,430 A | 12/1966 | Dedricks et al. | |
| 3,299,651 A | 1/1967 | McGrath | |
| 3,537,988 A | 11/1970 | Marcinkowsky et al. | |
| 3,675,442 A | 7/1972 | Swanson | |
| 3,915,180 A | 10/1975 | Jacobs | |
| 4,027,727 A | 6/1977 | Pullens | |
| 4,152,842 A | 5/1979 | Laughlin | |
| 4,204,956 A | 5/1980 | Flatow | |
| 4,255,937 A | 3/1981 | Ehrlich | |
| 4,351,651 A | 9/1982 | Courneya | |
| 4,484,315 A | 11/1984 | Hall | |
| 4,915,261 A * | 4/1990 | Strenger | 222/92 |
| 5,087,419 A | 2/1992 | Lutz | |

(Continued)

FOREIGN PATENT DOCUMENTS

WO    WO 9812489    3/1998

*Primary Examiner* — Mohammad M Ali
(74) *Attorney, Agent, or Firm* — Cislo & Thomas, LLP (57) ABSTRACT

A portable, combination dehydrator, dry return air and condensed water generator/dispenser configured to alternately provide water from a reservoir of condensed water or from an alternative source of water. In one embodiment, the alternative source comprises a five-gallon bottle of water and the mounting for the bottle includes a removable cover for preventing contamination of the system when the bottle is not in place. In one embodiment, the system provides purified dry make-up air to a home or office air conditioning system and dehydration cabinet, while producing pure atmospheric condensation from humidity found in the air and purifying the air and water for breathing, dispensing and drinking purposes.

32 Claims, 9 Drawing Sheets

(56) References Cited

U.S. PATENT DOCUMENTS

| | | | |
|---|---|---|---|
| 5,106,512 A | | 4/1992 | Reidy |
| 5,119,571 A | | 6/1992 | Beasley |
| 5,149,446 A | | 9/1992 | Reidy |
| 5,203,989 A | | 4/1993 | Reidy |
| 5,227,053 A | | 7/1993 | Brym |
| 5,235,906 A | | 8/1993 | Hsu |
| 5,250,258 A | | 10/1993 | Oh |
| 5,259,203 A | | 11/1993 | Engel |
| 5,301,516 A | | 4/1994 | Poindexter |
| 5,315,830 A | | 5/1994 | Doke |
| 5,366,705 A | | 11/1994 | Reidy |
| 5,398,517 A | | 3/1995 | Poindexter |
| 5,440,835 A | * | 8/1995 | Romo ............... 47/48.5 |
| 5,474,748 A | * | 12/1995 | Szabo ............... 422/186.04 |
| 5,484,538 A | | 1/1996 | Woodward |
| 5,517,829 A | | 5/1996 | Michael |
| 5,553,459 A | | 9/1996 | Harrison |
| 5,564,601 A | | 10/1996 | Cleland et al. |
| 5,669,221 A | | 9/1997 | LeBlue |
| 5,701,749 A | | 12/1997 | Zakryk |
| 5,704,223 A | | 1/1998 | MacPherson |
| 5,751,599 A | | 5/1998 | Bortnik et al. |
| 5,765,726 A | | 6/1998 | Jones |
| 5,766,488 A | * | 6/1998 | Uban et al. ............... 210/739 |
| 5,845,504 A | | 12/1998 | LeBleu |
| 5,857,344 A | | 1/1999 | Rosenthal |
| 6,029,461 A | * | 2/2000 | Zakryk ............... 62/93 |
| 6,058,718 A | | 5/2000 | Forsberg |
| 6,139,726 A | | 10/2000 | Greene |
| 6,182,453 B1 | * | 2/2001 | Forsberg ............... 62/125 |
| 6,390,378 B1 | | 5/2002 | Briscoe, Jr. et al. |
| 6,405,547 B2 | | 6/2002 | Hiraoka et al. |
| 6,453,955 B1 | | 9/2002 | Lee |
| 6,912,867 B2 | | 7/2005 | Busick |
| 6,931,756 B2 | | 8/2005 | Morgan et al. |
| 6,953,940 B2 | * | 10/2005 | Leighley et al. ............... 250/455.11 |
| 7,175,054 B2 | | 2/2007 | Davis et al. |
| 7,497,773 B1 | | 3/2009 | Schmidt |
| 8,028,536 B2 | | 10/2011 | Morgan et al. |
| 2005/0160620 A1 | | 7/2005 | Morgan et al. |

\* cited by examiner

COMBINATION DEHYDRATOR, DRY RETURN AIR AND CONDENSED WATER GENERATOR/DISPENSER

CROSS-REFERENCES TO RELATED APPLICATIONS

This patent application is a continuation of U.S. patent application Ser. No. 11/150,909 filed Jun. 13, 2005 for Combination Dehydrator, Dry Return Air and Condensed Water Generator/Dispenser, which claims the benefit of U.S. Provisional Patent Application No. 60/582,304, filed Jun. 24, 2004, and is a continuation-in-part application of U.S. patent application Ser. No. 10/167,966, filed on Jun. 10, 2002, which claims the benefit of U.S. Provisional Patent Application No. 60/296,472, filed Jun. 8, 2001, which applications are incorporated here by this reference.

TECHNICAL FIELD

This invention relates to dehydrators, dry return air and water condensers, and, more particularly, a combined combination dehydrator, dry return air and condensed water generator, dispenser.

BACKGROUND ART

There is a worldwide crisis in our potable water supply. The World Bank has estimated that $600 billion must be invested in water delivery systems. The United Nations has announced a worldwide water shortage and has predicted that, by the year 2010, this crisis could be a catalyst for conflicts and wars.

Many countries of the world already have an inadequate water supply. Usable water supplies have been reduced by pollution and sewage waste.

Various means have been suggested for treating water, such as with chemicals such as chlorine or other halogens. However, the by-products of such treatment may be toxic and result in further contamination. Treated municipal water supplies may be contaminated with lead, leading to health problems in drinking such water.

Various attempts have been made to come up with a system for dehydrating fruits and vegetables and/or condensing and purifying the water produced in such systems. Known prior art patents relating to such systems are the following:

| | | |
|---|---|---|
| 3,035,418 | May 1962 | Wright |
| 3,675,442 | July 1972 | Swanson |
| 3,748,867 | July 1973 | Bel Hamri |
| 3,777,456 | December 1973 | Lund |
| 4,050,262 | September 1977 | Mehnert |
| 4,080,186 | March 1978 | Ockert |
| 4,146,372 | March 1979 | Groth et al. |
| 4,148,617 | April 1979 | Clark |
| 4,163,373 | August 1979 | Van Der Sluijs |
| 4,185,969 | January 1980 | Bulang |
| 4,197,713 | April 1980 | Bulang |
| 4,204,956 | May 1980 | Flatow |
| 255,937 | March 1981 | Ehrlich |
| 5,106,512 | April 1992 | Reidy |
| 5,149,446 | September 1992 | Reidy |
| 5,203,989 | April 1993 | Reidy |
| 5,227,053 | July 1993 | Brym |
| 5,259,203 | November 1993 | Engel et al. |
| 5,301,516 | April 1994 | Poindexter |
| 5,315,830 | May 1994 | Doke et al. |
| 5,366,705 | November 1994 | Reidy |
| 5,484,538 | January 1996 | Woodward |
| 5,517,829 | May 1996 | Michael |
| 5,553,459 | September 1996 | Harrison |
| 5,669,221 | September 1997 | LeBleu et al. |
| 5,701,749 | December 1997 | Zakryk |
| 5,704,223 | January 1998 | MacPherson et al. |
| 5,846,296 | December 1998 | Krumsvik |
| 5,845,504 | December 1998 | LeBleu |
| 5,857,344 | January 1999 | Rosenthal |
| 6,029,461 | February 2000 | Zakryk |
| 6,058,718 | May 2000 | Forsberg |
| 6,182,453 | February 2001 | Forsberg |

Not one of the systems disclosed in the foregoing patents incorporates the specific function of extracting the humidity from the ambient air and using that air as a means to be used and designed as a dehydrator, and dry return air dispenser.

The above patents disclose large and small water condensing units, none realizing the benefits of heated dehydrated, dry return air as a source of preserving desired items, and none conveniently operate all functions with a remote control.

For example, U.S. Pat. No. 5,106,512 discloses a fixed-position, large-volume, high-rate water generator suitable for supplying drinking water to an entire office building, laundry, etc. The device is described as "having ducts for bringing this supply of ambient air to the device and for releasing the air back outside the device after it has been processed." The gravity flow water filter of Reidy (512) is located under the collection pan and is severely limited in both flow rate and minimum pore size by the gravity-feed pressure head.

In U.S. Pat. No. 5,301,516 to Poindexter, there is no germicidal light or a remote collection diverter valve. A drain is shown in FIG. 2 but none in FIG. 1. The drain is shown on the bottom of the apparatus which, if on the floor, is essentially inoperable and, if raised on a stand, makes a top-heavy unit which would require permanent wall anchors. The specification goes into great detail on the types of chemicals usable to clean areas which contact the water.

In U.S. Pat. No. 5,259,203 to Engle et al., there are essentially two tandem dehumidifiers. A second-stage compressor with its condenser coil immersed in the storage tank produces heated water. One familiar with the art realizes that such heated water would never reach 75° C. A further problem of locating the condenser coil in the storage tank is that it prevents removal of the tank for cleaning without opening the refrigerant system. Still further maintenance problems arise from the positioning of drains, i.e., there are no external dispensing valves and the drain valves are poorly located for replacing the valves because of the limited access inherent in their location.

In U.S. Pat. No. 5,553,459 to Harrison, This unit must be primed initially with approximately 10 liters of start-up water which can be a source of initial contaminants.

In U.S. Pat. No. 3,675,442 to Swanson, some of the same deficiencies as in Harrison (459) are present. Further, Swanson lacks an air filter or a UV disinfecting system. While Swanson's discharge device is shown in one figure, the location and operating parameters are not specified.

Brym (U.S. Pat. No. 5,227,053) provides a UV-activated catalyst water purifier/dispenser for tap water (well or public supply), which can be installed below the counter or enclosed in a cabinet. This unit merely treats water supplied to it, and, in the process, a certain portion of the incoming flow is diverted to waste.

U.S. Pat. No. 5,517,829 to Michael discloses a device for producing and filtering "drinking" water across "activated charcoal" and a "plastic mesh microspore filter. Further, it has no provision for continuing circulation of water in order to maintain purity.

In U.S. Pat. No. 6,182,453 to Forsberg, Forsberg claims the ability to connect the portable unit to city water supply in times of low humidity. Forsberg does not have a sediment filter, which is necessary for city or well water supplies. Forsberg has a single charcoal filter, which, if hooked up to city water, will clog the filter in a very short time therefore ruining the filter and adding no future protection.

In U.S. Pat. No. 5,704,223 to MacPherson et al., there is described a thermoelectric, TE cooler attached to a medicine-cooler bag containing an insulin vial. The drug vial cooler disclosed is a non-circulating, closed, small-volume, sterile fluid system.

In U.S. Pat. No. 5,701,749 to Zakryk, there is described a water cooler with a TE cooling junction integrated into the side walls of the holding tank. Zakryk's U.S. Pat. No. 6,029,461 describes and claims the water cooler of his '749 patent which further includes a water filter assembly.

In U.S. Pat. No. 5,315,830 to Doke et al., there is described a TE apparatus integrated into an insulated picnic or food-transport container.

There is thus a need for a combined dehydrator and condensed water dispenser which dehydrates any chosen item preserving them for future consumption or use and thus benefits those who rely on seasonal crops as a main food source. Such a device should be portable and the water extracted from the humidity taken out of the ambient air makes the air dry enough to dehydrate fruits and vegetables for example and the recovered water then becomes a valuable drinking source. Such a system should act as a food and water source and be able to operate off of a solar panel or a rechargeable battery.

DISCLOSURE OF INVENTION

This invention comprises systems and methods for condensing water from ambient air while providing dry air for various purposes. In one embodiment, a system condenses water from the air, and the dry return air is passed through a dehydration chamber in order to dehydrate items (for example, fruits and vegetables.) The dried air exiting the dehydration chamber is then provided to the return air intake of an A/C system, thereby increasing the efficiency of the A/C system. The system further includes a fitting to enable an alternative water source (e.g., a five-gallon water bottle) to be selected for dispensing water when there is insufficient humidity to allow water to be efficiently condensed out of the ambient air.

Various embodiments of the invention may provide such a combined combination dehydrator, dry return air and condensed water generator/dispenser that is portable and capable of operating off of solar panels or a rechargeable battery.

Various embodiments of the invention may provide methods for providing a portable, atmospheric dehydrant and water condenser for dehydrating chosen items while producing dry return air and while producing pure atmospheric condensation from humidity found in the air and purifying said water for dispensing and drinking purposes.

Various embodiments of the invention may provide a system for dehydrating, and create portable dry purified return air, while purifying the water extracted from the humidity making it potable.

Various embodiments of the invention may provide such a combined dehydrator, and portable purified return air, and condensed water dispenser that is portable and capable of operating off of solar panels or re-chargeable battery.

Various embodiments of the invention may provide a method for carrying out the foreign objects. This and other objects are preferably accomplished by providing a portable, atmospheric dehydrator, portable purified dry return air and water condenser for dehydrating chosen items while producing pure atmospheric condensation from humidity found in the air and purifying said water for dispensing and drinking purposes.

BEST MODE FOR CARRYING OUT THE INVENTION

Figure 1:
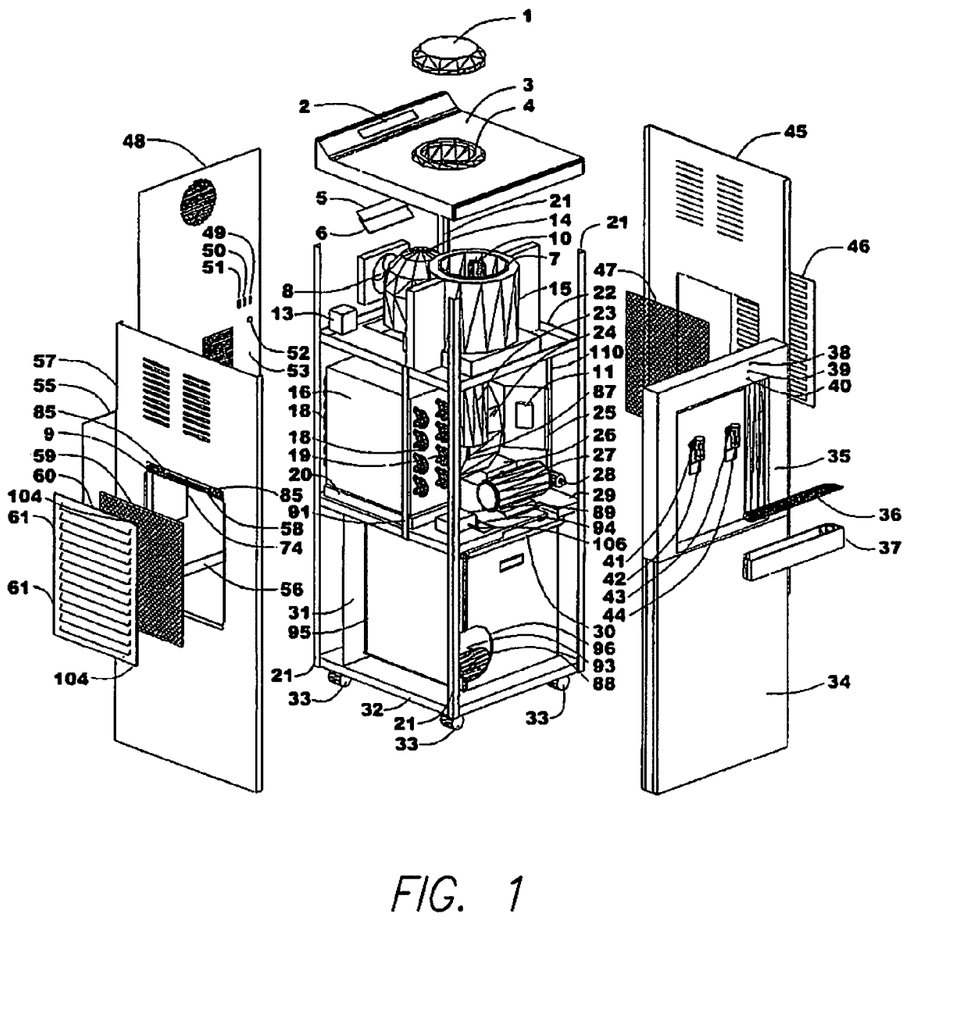
FIG. 1 is an exploded view of a combined dehydrator, dry return air and condensed water generator/dispenser apparatus in accordance with one embodiment.

Referring now to FIG. 1 of the drawings, one embodiment of the invention is shown in an exploded side view. This embodiment includes a combined combination dehydrator, dry return air and condensed water generator, dispenser apparatus is shown having a top lid 1, a bottled water excerptor 4 underneath lid 1, and a top 3 that the bottled water excerptor is attached to. A plastic cover 2 attached to the top 3 is clear and protects the LCD 5.

A cold water holding tank 15 is provided below lid 3 on upper shelf 22. A water line 64 attached to cold-water tank 15 extends to the cold-water faucet 44 where water is dispensed.

As seen in FIG. 1, cold water tank 7 shows a magnetic float switch 10 for reasons to be discussed further below. Styrofoam insulation 15 surrounds the cold water tank 7 and creates a baffle between the front and back of the upper shelf 22 as will be discussed.

A LCD 5 attached to the top lid 1 shows a visual display of the operations of the apparatus controlled by a suitable master computerized PCB control system 6, as will be discussed.

Figure 3:
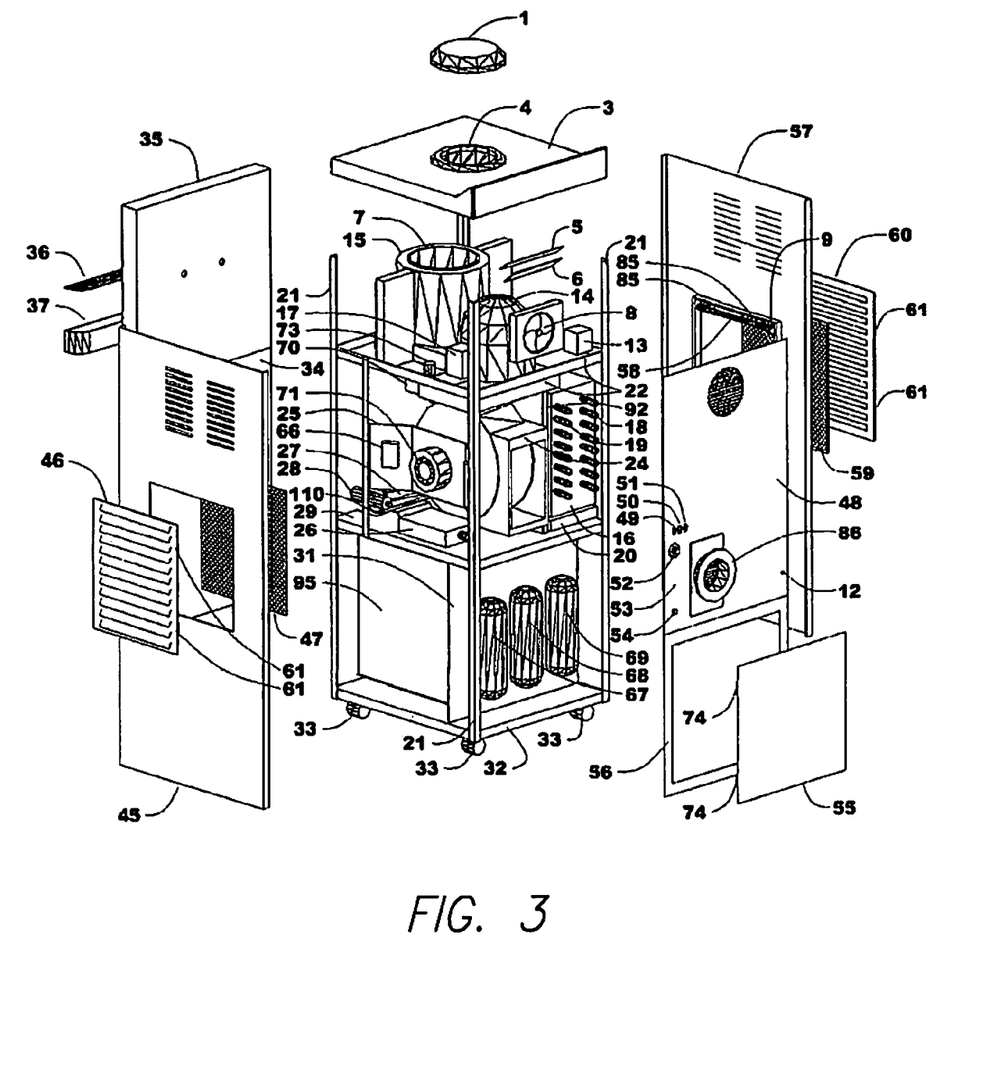
FIG. 3 is an alternative exploded view of the combined dehydrator, dry return air and condensed water generator/dispenser apparatus of FIG. 1.
Figure 4:
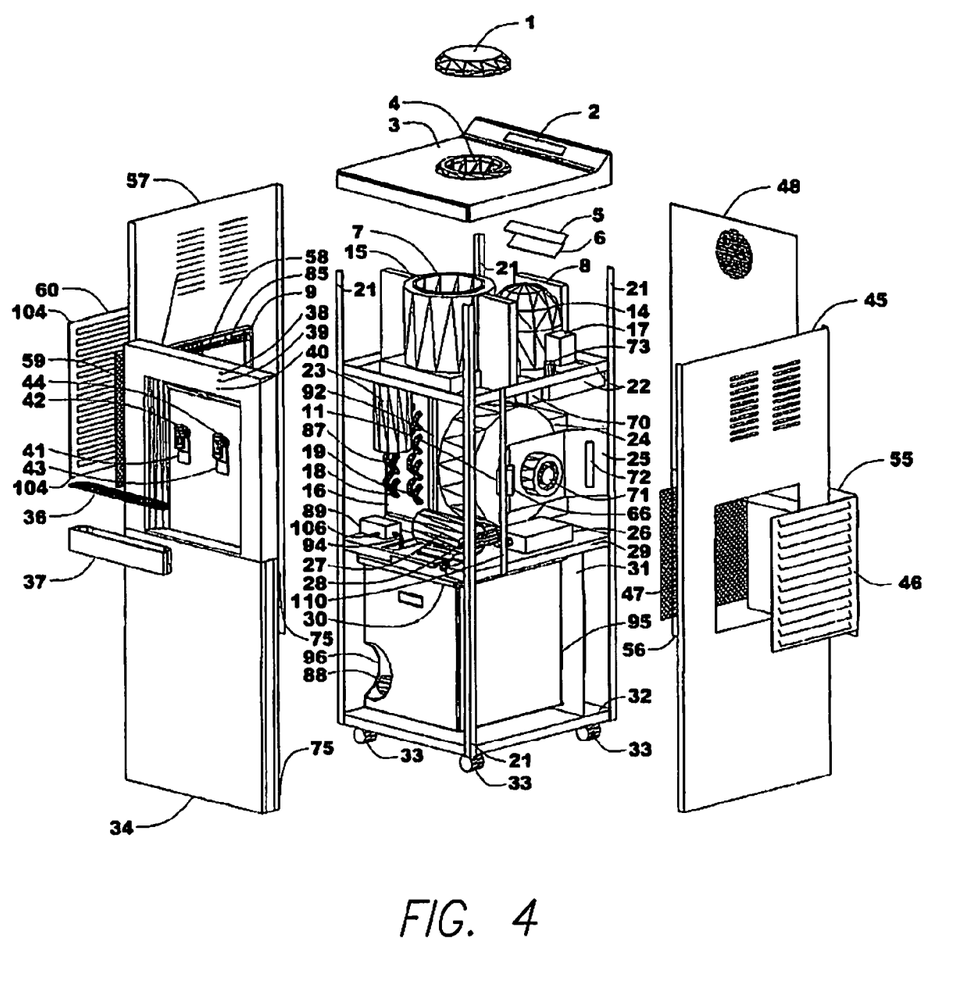
FIG. 4 is an alternative exploded view of the combined dehydrator, dry return air and condensed water generator/dispenser apparatus of FIG. 1.

A compressor 14 is located on a drop down panel of the upper shelf 22. Compressor 14 along with a capacitor 17 is attached to a relay switch 73 (FIG. 3).

A hot water tank 23 is attached to the bottom of the upper shelf 22. A water line 64 attached to the hot water tank 23 runs through a hold in the upper shelf 22 and connects to the hot water dispensing faucet 42. The drain for the hot water tank is a screw on and off cap 87.

The freon splitter 13 attached by seamless tubing to the compressor 14 on the upper shelf 22 connects to both the evaporator condenser 18 and the cold water tank 7 as will be discussed.

The evaporator condenser 18 and the heat exchanger 19 are supported by brackets 21 a full support brace and 91 a short brace located between the middle shelf 29 and the top shelf 22. A molded attachment 92 is designed to connect the intake and exhaust fan casing 24 to the evaporator condenser 16.

A bracket 25 mounted two support braces 21 and 27 is designed to hold the fan 71. Ballast 11, ballast 66 and a power supply strip 72 are mounted on the bracket 25.

A stainless steel drip tray 20 captures the water from the evaporator 18 and water flows via gravity through the bottom tank lid 30 with a stainless steel tube connected to the stainless steel drip tray 20 down into a sealed hole 80 in the stainless steel holding tank 95.

Located on the middle shelf 29 is the power supply for the water pump 26, self priming water pump 27 and ozoneator 89. A stainless steel siphon tube 78 is connected to the bottom water holding tank 95 by a nut 83. A water tube 64 connects the stainless steel siphon tube 78 to the water pump inlet 28 with quick disconnect fittings.

The ozonator 89 ozonates the water by passing ozone through a stainless steel tubing 94 into the water in the bottom holding tank. This is a removable ozone generator injector that can be used in or out of the unit. While mounted inside the unit, the ozone generator is operated by the PCB. A tube 106 which can attach to the front of the ozone generator while it is still inside the unit of that can be placed into any object desired to inject ozone into the object. The ozone generator is removable and when removed from the unit the ozone generator can operate off of an AC adaptor. Removing the ozone generator 89 also allows for the drip tray 20 to slide out for cleaning.

Figure 5:
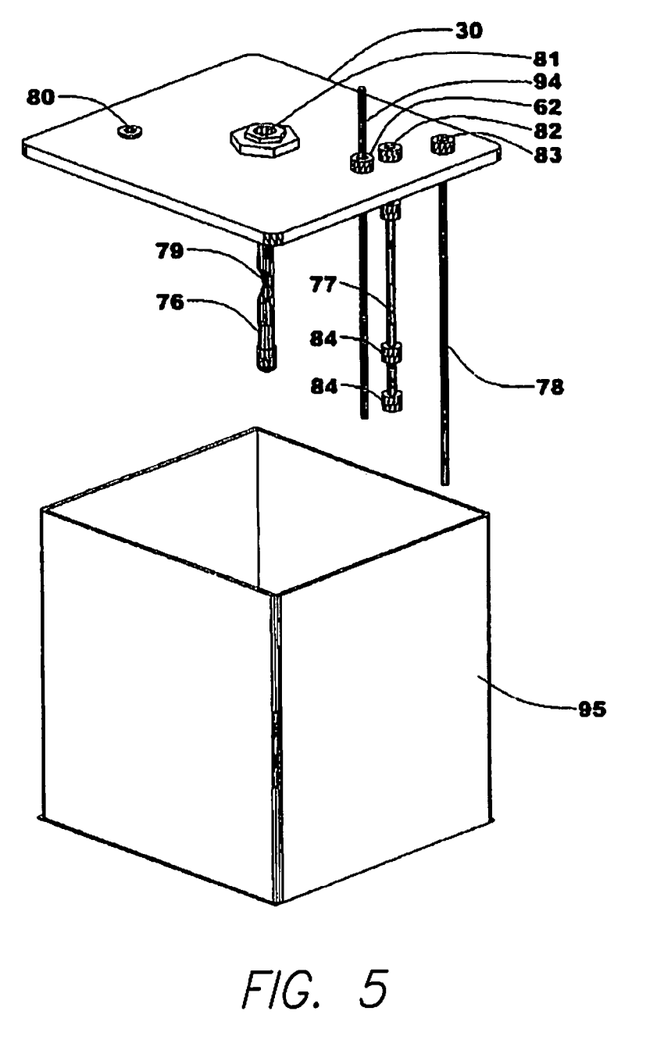
FIG. 5 is an exploded view illustrating the bottom tank UV lamp float sensors for the operations controlling the turning off and on the water pump and compressor in accordance with one embodiment.

A pump 88 located inside the bottom holding tank continually moves the water via a glass tube 93 in the tank. The glass tube 93 wraps around the crystal cylinder 76 that holds the UV lamp 79 and from the top sends the water back shooting towards the bottom. The water does not leave the tank As seen in FIG. 5, a nut 81 holds the crystal tube 76 to the bottom tank lid 30. The crystal tube 76 holds the UV lamp 79 by sliding it down into the crystal tube 76.

As seen in FIG. 3, behind the bottom water tank 95 is an inside panel holding water filters 31. This is used for mounting the water filters 67, 68 and 69.

As seen in FIG. 14, wheels 33 support the unit making the combination dehydrator, dry return air and condensed water generator, dispenser portable.

Figure 6:
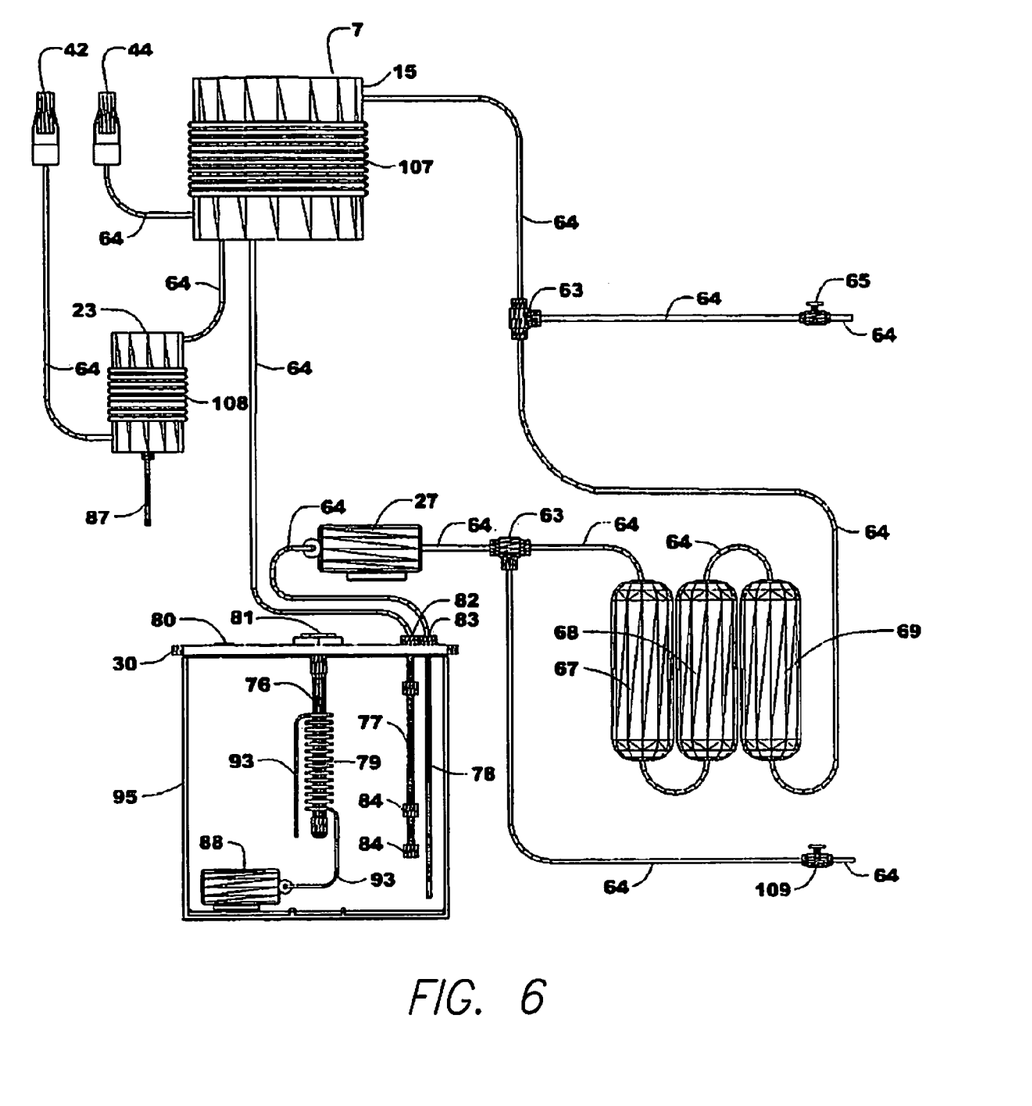
FIG. 6 is a diagrammatic exploded view showing the flow of the water from the bottom holding tank to the dispensing faucets, the circulation pump and tubing circulating the water around the UV lamp in the bottom tank, and the inlet for the city water and line and valve for filling external bottles or emptying of the bottom tank in accordance with one embodiment.

FIG. 6 is the flow chart of the water movement. When magnetic float switch 10 as seen in FIG. 1 goes down, this turns on the self priming water pump 27 and draws water in through the stainless steel siphon tube 78 as shown in FIG. 5. As shown in FIG. 6, the water continues running through the water line 64, passes through the first sediment water filter 67, second porcelain water filter 68 then through the third colloidal silver carbon water filter 69 and finally up to the top stainless steel cold water holding tank 7. The flow of water can be interrupted by opening the quick disconnect ball valve 65 located on the middle shelf 29. This can be used both for emptying the bottom holding tank 95 and for filling external bottles.

Referring now to FIG. 1, all shelves (top 22, middle 29, and bottom shelve 32) are connected together by corner braces 21 and can stand freely without a skin for assembly.

Side panel 57 attaches to corner braces 21. As in seen in FIG. 1, brackets 85 are attached to the side panel 57 inlet. Where the air enters, a UV Lamp 58 is snapped into brackets 85. UV lamp inlet door off on switch 9 is located by the UV Lamp 58. The intake air filter 59 is located on the inside of the left panel door 60 that swings open and closed on hinges 61.

FIG. 3 shows the right panel 45. Right panel 45 attaches to corner braces 21. Side vent 46 attaches to right side panel 45.

Back panel 56 as shown in FIG. 3 attaches to corner braces 21. Also seen in FIG. 3 are the main power off/on switch 49, the cold water sensor off/on switch 50, and the hot water sensor switch 51 as well as the humidistat 52, the return air duct 86, cold water thermostat control 53, surge protector 54, humidity sensor 12 are all mounted to the back panel 56. Back panel door 55 swings open and closed on hinges 74 creating access to the water filters 67, 68 and 69.

Figure 7:
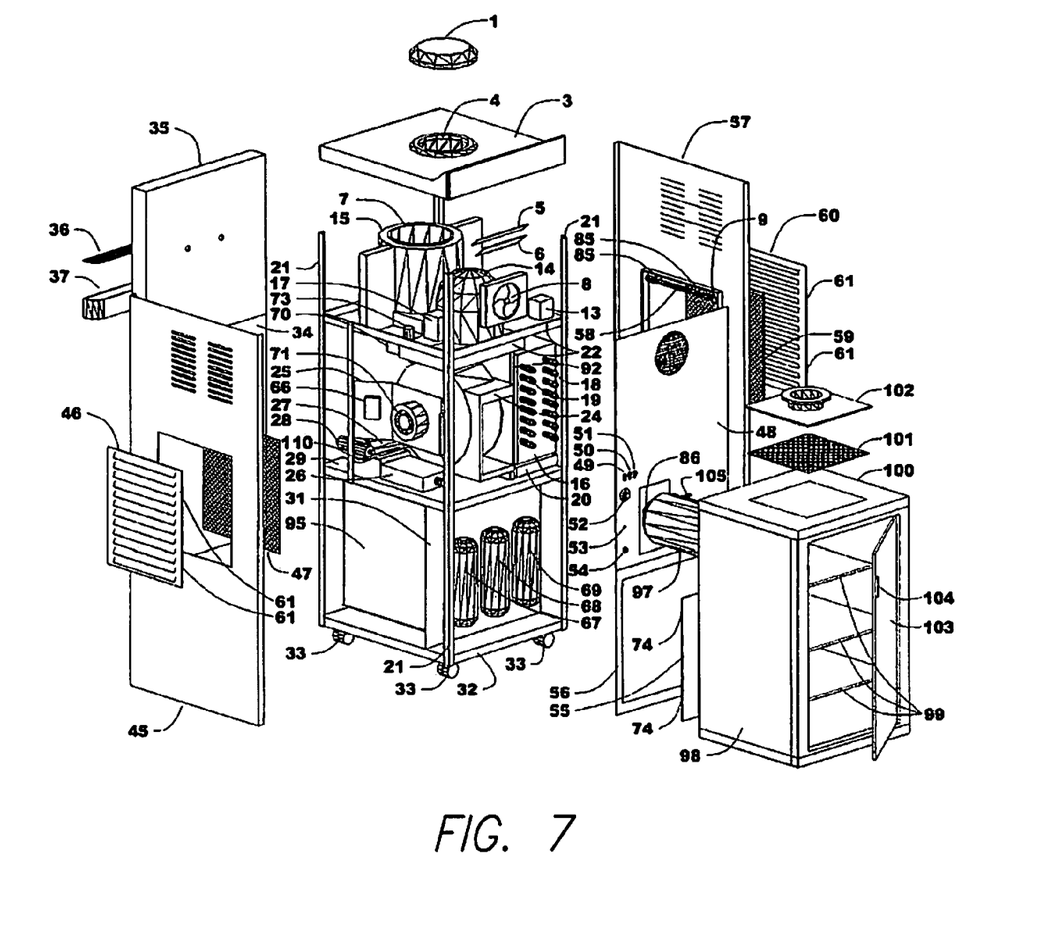
FIG. 7 shows the dehydrators attaching to the atmospheric water generator receiving dry air.
Figure 8:
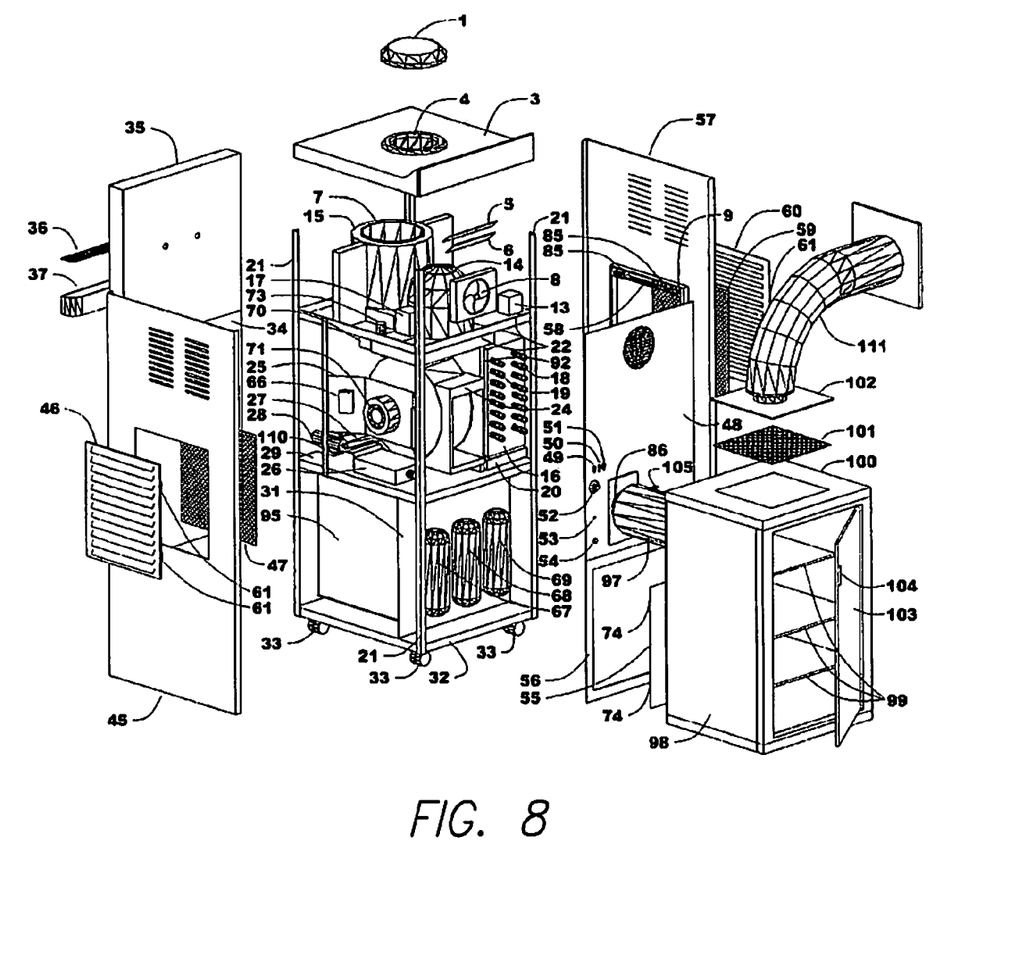
FIG. 8 is an exploded view of the dehydrator and the duct sending dry air to a return air system.
Figure 9:
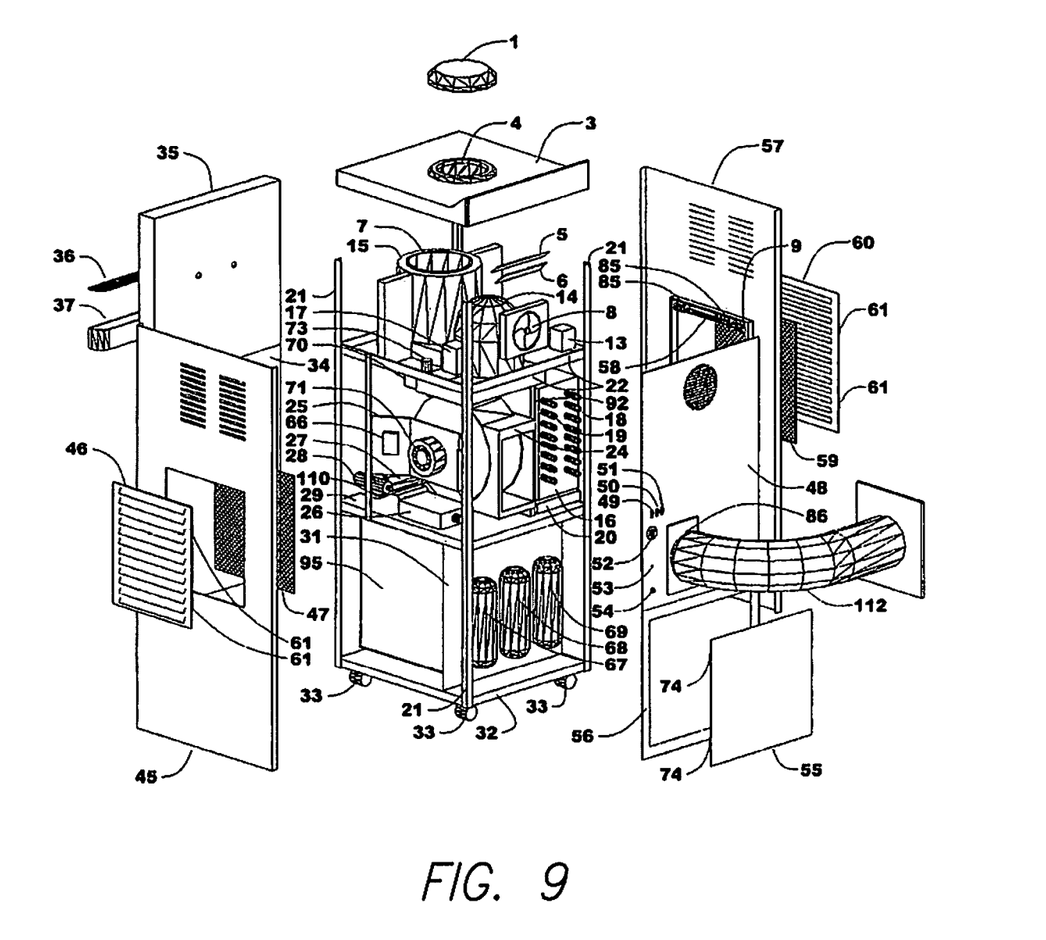
FIG. 9 shows the system without the dehydrator and the duct sending dry air directly the return air system.

Air is drawn via fan 71 inwardly through vent 60, through the air filter 59, past the UV lamp 58 and across the atmospheric chilling collection coils 18. As the compressor 14 chills the coils 18, the heat exchange 19 builds up inside the apparatus housing. The fan 71 then dispenses the hot air out flanged outlet 86 through the outlet inside the flexible duct 112 (FIG. 9). This creates an open air flow for sending dry air into any return air system via flexible duct by rolling the unit on wheels 33 to that inlet and attaching the duct to that said inlet. One can easily move the unit and send dry air through flexible duct 112 (FIG. 9) into any return air intake in, for example, a home or office A/C unit, making the A/C unit operate more efficiently. Dried air helps dry the evaporation coils of the home or office A/C unit, allowing more evaporation on evaporator coils, thus allowing A/C unit to operate more efficiently. The flanged connection outlet 86 for the return duct 97 (FIG. 8) attaches to the back panel 56 by sliding it over the flanged exhaust air outlet 86 and securing it with easily attachable clips. The duct 97 can be cut to length to custom fit to reach from where the combination dehydrator, dry return air and condensed water generator dispenser to the return air system in the home or office. Ducts 97 can also attach to the back of the dehydrator cabinet 98 (FIG. 8). One can place any object to be dried or inside the enclosed dehydrator cabinet 98 (FIG. 7), which also has three shelves 99. The enclosed unit 98 has a vented top 100 with a rodent and insect screen 101 and a top louvered vent 102. With the heated air going into the cabinet 98, and the door 103 closed, all objects inside the cabinet 98 dehydrate and dry much quicker. The top air vent can then be sent via duct 111 (FIG. 8) to the return air intake of a home or office A/C unit, using the multi purpose exhaust air for return air mixed in the duct system in homes, office and dry storage. Duct intake picks up air from outside. When humidity reaches 40% relative humidity or more inside the home office or dry storage unit, then a solenoid will open and allow intake air from the inside space to be used to dry out the interior space. Once the humidity level drops below 40% RH, then the solenoid will close to the inside and begins to draw air from the outside again. The unit will not run if the RH is below 20% both inside and outside.

The whisper quiet fan 71 draws air from the side inlet vent in panel 57 through an air filter system 59 and across the atmospheric chilling collection coils 18. As the compressor 14 chills the coils 18, atmospheric condensation builds up on the food grade coated surface of the evaporator fins 16 (which may be FDA-approved). The atmospheric condensation begins to flow downwardly by way of gravity flow into the stainless steel collection drip tray 20 and then downwardly through the drip tray funnel 80 continuing to gravity-drip into the bottom stainless steel holding tank 95.

Once the condensate has entered the bottom stainless steel holding tank 95, it is exposed to the UV lamp 79 resting in the crystal tube 76 and a circulating pump 88. A glass tube 94 wraps around the crystal cylinder that holds the UV lamp and from the top sends the water back shooting towards the bottom of the tank. The water does not leave the holding tank 95.

The holding tank 95 is located at the bottom of the unit and is mounted directly on bottom shelf 32. For ease of removal for cleaning, a handle at the front of the holding tank 95 allows you to pull and slide the tank out of the unit. The lid 30 of the holding tank 95 holds the siphon tube 78, with stem 77 holding the magnetic float switches 84, and crystal tube 76 holding the UV lamp 79. It can be reinstalled by sliding it back on the bottom shelf 32. The holding tank 95 may be a nearly completely closed ten gallon stainless steel container. The pump 88 located inside the collection holding tank 95 is turned off and on by a float switch located at the bottom of the pump. A combination of the magnetic float switches 84 located inside the first collection holding tank 95 and the magnetic float switch 10 in the top stainless steel collection holding tank 7 controls the dry air and water making process. When the water is dispensed from the top collection holding tank 7, the magnetic float switch 10 in the top stainless steel collection holding tank 7 turns on the self priming pump 27 on and it pumps water from the bottom holding tank 95 to the top tank 7. As the water in tank 95 leaves the tank to refill top tank 7, the magnetic float switches 84 lowers and calls for the compressor 14 and the fan 71 (FIG. 1) to turn on and draw air from the side inlet vent in panel 60 through an air filter system 59 and across the atmospheric chilling collection coils 18 to begin making more water and dry return air and hot dry dehydrating air.

As the pump 27 (FIG. 1) runs, it draws water from the lower tank up through the siphon tube 78 and pumps it through the antibacterial tubing 64, where it passes through the first part of a three-stage filtration system. Sediment filter 67 is connected to the second filter 68 in line. The porcelain filter 68 is then connected to the third filter in line, and the colloidal silver/carbon filter 69 is then connected to the top collection holding tank 7. This is accomplished with a single water line. As the water raises the magnetic float switch 84 up in tank 95, it shuts off the compressor 14 (FIG. 1). Even when the unit is not running and making dry air and water, a pump that is located inside the bottom holding tank 15 continually moves the water inside the same tank via a glass tube in the tank. A glass tube that wraps around the crystal cylinder that holds the UV lamp and from the top sends the water back shooting towards the bottom of the tank. Water does not leave the tank. Water moves in a circular motion close to the UV lamp 79, creating extra exposure of the water to the UV Lamp 79. A water valve 65 (FIG. 6), when open, automatically bypasses the normal route of the water path and sends the water directly from the water filters to an external holding tank, such as five-gallon water bottles. This bypass can also be used for emptying the tank.

As the first holding tank 95 is filling up with water, indicating bars on the LCD 5 start to light up. Each bar displayed indicates 2.5 gallons of water are in the holding tank 95. When the tank 95 is full, four bars are displayed on the LED 5, indicating the tank is full. Even when the tanks are full, the pump 88 continues running and sending the water around the UV lamp. Cold water is dispensed out of the cold water container through the dispenser faucet connection 44 by pushing on lever 43. Cold water can be dispensed with the use of only one hand. Hot water is dispensed out of the hot water container through the dispenser faucet connection 42 by pushing on lever 41. Hot water can be dispensed with the use of only one hand.

Maintaining a desired temperature in the cold water tank 7 is accomplished by the use of the compressor 14 with an internal electro-solenoid freon splitter 13. An in-line thermostat 53 monitors the temperature of the cold water in tank 7. When the cold water rises above the desirable temperature, the compressor 14 engages, bypassing the atmospheric chilling collection coils 18 (FIG. 1) and passing through the copper coils 107 (FIG. 6) that are wrapped evenly around the cold water holding tank 7. It is possible to turn the cold water sensor off by turning the cold water off/on switch 50 to the off position.

The water in the top tank 7 (FIG. 6), driven by gravity, flows through the antibacterial tubing 64 and flows into the hot water tank 23. Hot water is dispensed out of the hot water container 23 through the hot water dispenser faucet 42 (FIG. 6). The heating of the water in the hot water tank 7 is accomplished by the use of a heating element 108 wrapped around the hot water tank (FIG. 6), which senses the temperature of the collected water within the container 23 and engages if the temperature falls below the desired temperature.

Figure 2:
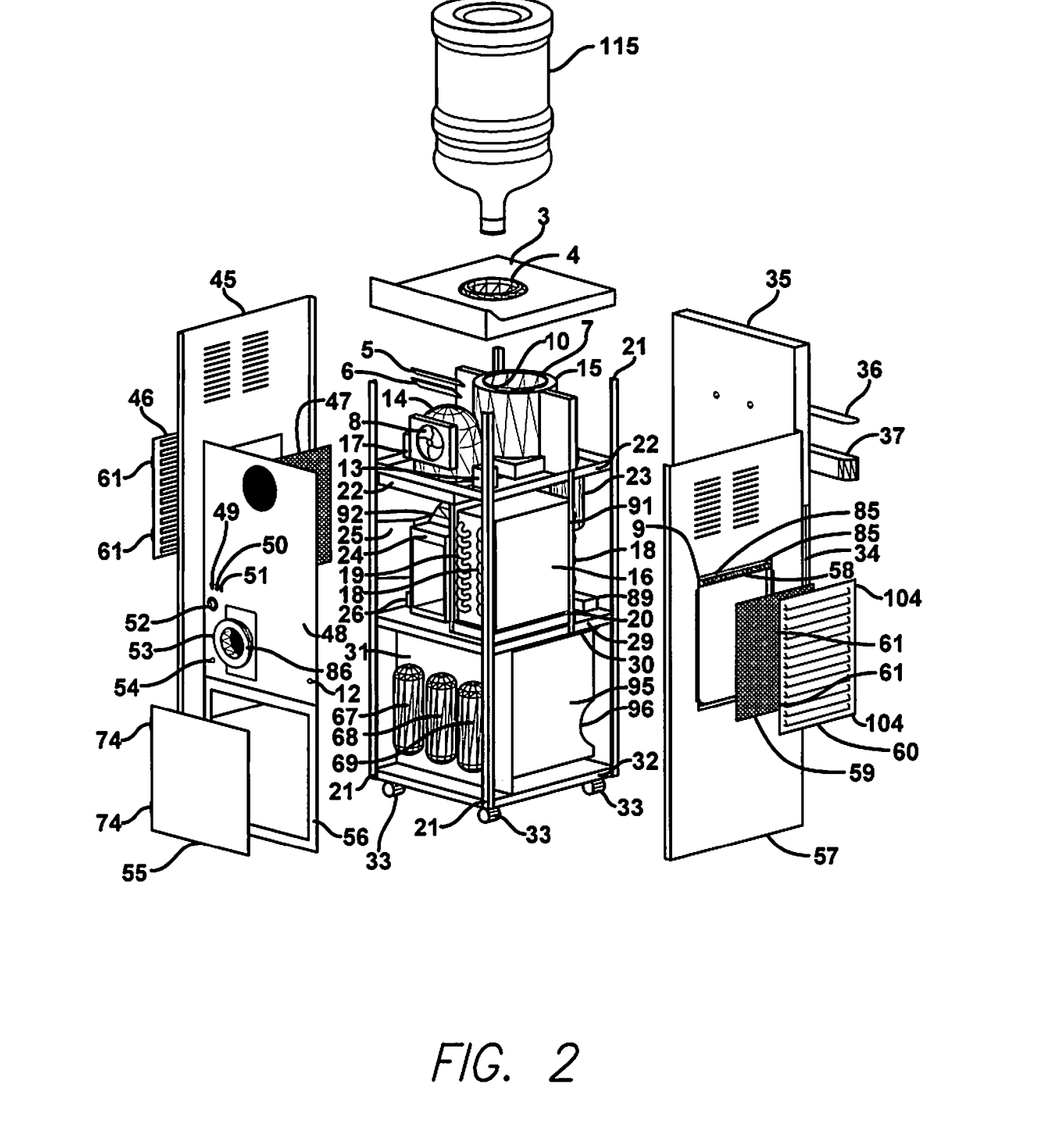
FIG. 2 is an alternative exploded view of the combined dehydrator, dry return air and condensed water generator/dispenser apparatus of FIG. 1.

The internal electro-solenoid 13, in conjunction with the compressor 14, is controlled atmospherically by the thermostat 53 and humidistat 52 (FIG. 2). When the humidity falls below a chosen set level at which the humidistat 52 is set the unit will not operate. When the humidity rises above the desired chosen level at which the humidistat 52 is set, the unit will once again start to run. The compressor 14 has a two minute delay, once turned off, when turning back on.

The humidistat 52 and thermostat 53 are powered by the PCB 6. The humidity level and temperature of the room or place the unit is located in is monitored on the LED readout 5. This operates together to gauge the temperature and humidity of the combination dehydrator, dry return air and condensed water generator, dispenser, as controlled by a user thereof, and maximizes the collection of concentrated humidity. The electro-solenoid splitter 13, in conjunction with the compressor 14, also controls the flow of the EPA-compliant refrigerant of the enclosed atmospheric chilling collection coils 18, being fitted with a thermostatic sensor 53 in the internal electro-solenoid splitter 13, is automatically regulated. This shuts the compressor 14 off since it is attached to the enclosed atmospheric chilling collection coils 18 (FIG. 1) to prevent formation of ice on cooling surfaces of the enclosed atmospheric chilling collection coils 18.

The removable top lid 1 of the machine allows access to the bottled water holder 4, which is designed to hold a 5-gallon bottle of water 115 in case of low humidity. This bottled water can be chilled, heated and dispensed from the normal working operations of the dehydrating water-making unit. One can also hook the apparatus up to city water by connection to the city water inlet valve 105 (FIG. 6) located on the bottom shelf 32. The city water enters the unit through a city water inlet valve 105 and is passed to the filters 67, 68, and 69 (FIG. 6). From there, it follows the path to the top holding tank 7 and then follows the path of dispensing described in FIG. 6.

Summary of Four Phases of Hot Air Dehydration and Dry Return Air

First Phase (Raising the core temperature) In the first phase of raising the core temperature, the product is warmed as fast as possible, without case hardening the product, to within 10 to 20 degrees of the process air temperature. In the counter flow configuration, the coils 18 are subjected to very wet air that has lost 20 degrees or more by passing through. This wet air transfers heat very fast and the dry air rises and the humidity stops. This accelerates the transition to the second phase.

Second Phase (Rapid Dehydration) In the second phase, the moisture content of the product is in near free fall. This phase may be located sent to the re-turn air inlet or sent inside the optional portable enclosure to maximize production. As a rule, the moisture content of the process air, when drying most products, measured at the high end, should be 17% to 19%. After the air passes through the dryer, the relative humidity at the cool end should be 35% to 50%. The lower this humidity level is, the more cooling capacity (using less energy) is accomplished.

Third Phase (Transition) Transition is the most critical phase. The high rate of moisture release experienced in the second phase slows down to a crawl. Most of the water in the product is gone. Capillary action at the cellular level now provides the majority of the free water being driven off. The evaporative cooling that has kept the core temperature of the product well below the process air temperature slows as well.

Fourth Phase (Bake Out) the final phase is characterized by a slow reduction in the product moisture content. This phase is normally the longest, and depending upon the target moisture content, may include over ½ the dwell time.

The need for the use of separating the atmospheric humidity from the ambient air for purifying dispensing and drinking is well known as discussed above.

It can be seen that there is disclosed a compact portable, combination dehydrator, dry return air and condensed water generator dispenser. This system is capable of ducting dry return air into a return air A/C system in, for example, a home and office can greatly improve the efficiency of the A/C. The system can also dehydrate chosen items in a separate compartment, while producing pure atmospheric condensation from the humidity found in the air for dispensing and drinking purposes. A compressed heat exchange moves filtered air (drawn from the outside humid ambient air) across the heat exchange and across the atmospheric chilling collection coils. In this process, the humidity is removed and stored. The dry heated air is then dispensed through vented outlets into an A/C return air inlet and/or into an optional portable enclosure via duct work for the purpose of dehydration. Optionally, a portable flexible duct system may be used for the exhausted heated air to travel through the portable duct work into an optional portable enclosure where the primary purpose of the optional portable enclosure is to house the shelving used as holding trays for dehydration of selected items for the primary purpose of dehydration.

Summary of Combination Dehydrator, Dry Return Air and Condensed Water Generator, Dispenser The layout of this Combination Dehydrator, Dry Return Air and Condensed Water Generator Dispenser is advantageous as; (1). It enables collection of a large amount of water in a small portable unit, (2). It provides dry air for several purposes (3). It provides ease of serviceability for the owner, such as in changing of air and water filters, (4). It provides serviceability of a malfunction by a service rep.

This layout is advantageous in this size machine, as it maximizes the amount of water the machine is capable of holding. The layout of this unit is unusual in comparison to prior art systems and is beneficial to the end user for conveniences to be discussed. By placing the compressor 14 on the top shelf 22, it allows room at the bottom of the unit for a nearly ten gallon water capacity holding tank 95. Prior systems place their compressors on the bottom shelf using up valuable space that is used in this unit for water storage. Also located on the top shelf is the freon splitter 13. The freon splitter allows the unit to operate with one compressor that is used both to make the water and to keep the water cold. Having the splitter located on the top shelf with the compressor makes it very easy to service if there is a problem with one or the other. Because the compressor is an air cooled compressor, a whisper quiet fan 8 has been located directly in front of the compressor. The fan runs when the compressor is running, drawing a continuous stream of air across the compressor and helping the compressor to run cooler. Vents are located one on each side of the compressor on the side panels, so the fan draws ambient air from the outside, across the compressor on the inside compartment. A baffle across the middle of the top compartment created by a Styrofoam wall blocks air from coming in anywhere other than the two side vents.

This unit adds extra protection to the quality of the air and water by placing a UV lamp 58 in between the intake air filter 59 and the evaporator 16, and a UV lamp 79 in the lower tank 95. The actual placement of the parts in this unit is advantageous. For instance, the evaporator 16 sits all the way back on the middle shelf 29, allowing room for the self priming water pump 27 and ozone generator 89 to be mounted in front of it. This is a beneficial location for these items, as they are directly over the bottom water tank 95 and both connect by quick disconnect tubing to tank 95.

The bracket 25 holds the fan motor, as well as the main power strip and both UV lamp ballast and all are easily accessible.

The front bottom door 35 swings open to make easy access to all items located in the bottom compartment and on the second shelf. The removable stainless steel bottom water holding tank 95 and stainless steel drip tray 20 pull out together. This allows the tank and drip tray to be cleaned when needed. The removable drip tray is important as some algae will collect on the drip tray over time even through the UV lamp keeps the drip tray sanitized it still needs to be cleanable over a long period of time. The tank 95 and drip tray 20 has rounded corners and rounded bottom and sides for NSF approval. The drip tray and bottom water holding tank are stainless steel because a UV lamp is placed over the drip tray and located inside the bottom holding tank. UV lamp will not break down stainless steel and has no chemical reaction as it does with most plastics. The stainless steel also adds extra reflection of the UV light.

Quick disconnect water hose fittings are used on all hose pump and filter fittings for ease of maintenance.

A self priming pump allows the unit to be shipped dry. This is beneficial for controlling bacteria at start up. Shipping units wet causes a greenhouse effect allowing bacteria to form. Bacteria will form in water tanks, filters and tubing in an enclosed wet environment in less than 48 hours. Once bacteria have infested the system you must replace all water lines. If this ever did happen to the combination dehydrator, dry return air and condensed water generator dispenser system, replacing of the water lines is made simple. There is only one flow of water line as shown in FIG. 6. All lines in the system utilize quick disconnect fittings and are located in easily accessible compartments. The pump is located inside the front bottom door 34. The water filters are located inside the bottom back door 56. The top tank is located just under the top lid 3. All tubing and water filters can be replaced in this unit in less than 20 minutes. The water holding tanks and drip tray can be cleaned in less than ten minutes. Once all tubing and water filters have been replaced and the water tanks and drip tray have been cleaned you are back to a newly sanitized unit. It is almost impossible to replace the tubing of other machines without tearing the entire unit apart.

The UV lamp in between the evaporator and intake air filter disinfects incoming air and helps maintain sterile, clean evaporator fins and coils. Keeping the air free of bacteria and virus is the most important step in keeping the water and air bacteria and virus free.

Stainless steel is used for the shaft on float switches 77 and water siphon tube 78 (FIG. 5), as UV breaks down other materials, such as most plastics.

Bottled water insert holder 4 allows the ability to add bottled water to the unit in times of low humidity. Without this feature, the machine would become useless in low humidity areas (like Chicago in the winter months). The ability to change the lids without disconnecting any of the machine controls is accomplished by simply lifting lid 1 off the bottled water insert holder. It is easy to then place a bottled water jug 115 on top. It also stops the water filters from being contaminated by an inlet for tap water, although an inlet for tap water is an accessory and part of this design. The bottled water does not pass thru the water filters. All functions of the machine still operate as normal. If the humidity levels return to a water making capacity, then the unit will turn on and begin making water even if a bottled water jug 115 is placed on the unit. Other than the hot and cold water and the dispenser functions, the water making device and the bottled water jug insert operate independently. The custom designed float switches in the top tank allowing the bottled water neck to fit right in.

Changing the air filter 59 and UV lamp 58 has been made extremely user/consumer friendly. The door/vent 60 simply unlatches 104 (FIG. 1) and the door/vent swings open. The air filter 59 slides in and out on tracks that are part of the door. The UV Lamp 58 snaps in and out of the holders 85 for UV lamp inside door on left panel. When the door opens, an off/on switch 9 turns the UV lamp off to protect the eyes of anyone opening the door. This also turns the entire unit off. When the door is closed, the unit will automatically turn back on in two minutes.

A two minute delay was put on the PCB to protect the compressor from turning off and on too quickly. If a compressor turns off and on too quickly, it would build up unnecessary head pressure on the compressor, making it over work and eventually lock up. No matter what function turns the compressor off, there is always a two minute delay when turning the compressor back on.

The vent over the fan motor 46 provides cooling for the fan as well as access for service of the fan motor 71, main power supply 72, UV ballast 66 and the power supply to the water pump 26. The entire layout of this design is advantageous because it is service friendly.

LCD 5 monitors all functions of the unit. LCD 5 displays when the unit is making water, when water is chilling, when water is pumping, when water is heating, the amount of water in the tank, and shows that the UV lamps are on and functioning properly. It also shows the temperature and humidity in the room at all times. The display is large and easy to read. The background colors of the light are changeable to adjust to a person's personal taste and ease of viewing. The LCD 5 also provides a night light. If the unit has a problem, such as a UV lamp burns out, the machine will not run and will make a beeping sound, letting the user know that there has been a malfunction.

Beside the LCD 5 on the top front upper face panel 35, are three indicator lights. They display power 38, In operation 39, and Heating 40.

Just below the additional indicator lights are the hot and cold water faucets, which can be used with one hand to dispense water. One can push a glass for example against the bars 42, and 44 (FIG. 1) under the faucet, and they open the valve to the water tanks and dispense water from the faucet.

The top whisper quiet exhaust fan in the top is beneficial in keeping the top compartment cooler. The humidistat allows user to adjust the humidity settings to turn the machine off and on at desired humidity levels, so as not to waste electricity in times of low humidity. The off/on switch on the hot and cold water gives the consumer the choice of hot, cold, or ambient water temperatures. The surge protector eliminates the need for fuses and protects the machine from power surges. It also eliminates the need for a service call, as the consumer can push the button and reset the machine following a power surge. The colloidal silver in the carbon filter is advantages as it will stop any bacteria from growing in the carbon (known to be a breeding ground for growing bacteria). The carbon is for taste and odor.

The Combination Dehydrator, Dry Return Air and Condensed Water Generator, Dispenser includes air filters that were custom designed for this unit, which include anti virus, anti-bacteria agents. The filters also remove suspended pollen or dust particles, so that contaminants and undesirable impurities from the environmental air are not carried into the dehydrator and water condenser dispenser section and then into the return systems of home and offices. The portable, Combination Dehydrator, Dry Return Air and Condensed Water Generator also includes a sterilization system, which provides purified liquid water that is filtered, heated, and chilled, at multiple temperatures ranging from 34° F. to 190° F., providing hot and cold purified water for all uses from iced tea to hot coffee.

The whisper quiet fan assures as low of a db level as possible to make it quite enough for inside homes and offices. The food grade coated atmospheric chilling collection coils may be coated with the same FDA-approved coating used on the inside walls of city plumbing water lines, and has life of more than 50 years. The compressed heat created in the primary housing is dry enough to dehydrate desired objects in the portable dehydration enclosure when exterior humidity levels are as high as 100% and send dry air into a return system via a duct into a home or office, for example, helping that A/C unit to operate more effectively because of adding dry air to the evaporating coils.

Both the water generator and dehydrator housings have wheels and are portable. Their sealed containers and screened vents make them completely rodent and insect-free.

This portable dehydration and water condensation unit may have a primary housing that makes it an attractive kitchen appliance. The unit can be supplied with an exterior skin (e.g., panels 1, 3, 34, 35, 45, 46, 48, 55, 56, 57,) made with a high quality plastic front, powder-coated metal sides, similar to that of a refrigerator, or an upgraded style of stainless steel to match that of many kitchens, where all appliances are stainless steel.

None of the prior art patents discussed above include any of the following:

a. Single removable cap for access to a bottled water holder.

b. UV Lamp located between the intake air filter and evaporator coils and condenser keeping incoming air sterile and the evaporator coils free of growth such as slime and agley.

c. a pump that is located inside the bottom holding tank that continually moves the water inside the same tank via a tube in the tank. A tube that wraps around the crystal cylinder that holds the UV lamp and from the top sends the water back shooting towards the bottom of the tank. Water that does not leave the tank. Water that moves in a circular motion close to the UV lamp 79 creating extra exposure to the water to the UV Lamp 79.

d. Unit contains all stainless steel water holding tanks, and drip tray. All can be exposed to continuous UV without harm.

e. combination stainless steel holding tank with UV lamp that is down in the stainless steel tank that while it is in the water the UV lamp operates.

f. A water valve that when open automatically bypasses the normal route of the water path and that sends the water directly from the water filters to an external holding tank such as five gallon water bottles. And that this bypass can also be used for emptying the tank via the pump.

g. Attached holding tank and drip tray that easily remove from there compartment together yet separate at opening. Tank and drip tray are removable without having to disconnect anything they simply slide out by pulling on the handle. The lid lifts off and both drip tray and holding tank can be washed ands cleaned in a sink.

h. the ability to send dried air via duct work into a free standing compartment for dehydration and through that compartment out continuing duct work and into a return air system for an A/C in home or office or dry storage.

i. Stainless steel siphon tube so UV lamp will not break it down as this is located in the bottom holding tank with continuous UV lamp exposure.

j. Self priming water pump.

k. a safety switch on the UV lamp door which turns the UV lamp off when the door is open to protect eyes of the service person and back on when the door is closed.

l. Stainless steel shaft holding magnetic float switches that UV lamp will not break down as this is located in the bottom holding tank with continuous UV lamp exposure.

m. Stainless steel shaft attached to the ozone injector injecting ozone into the main holding tank that UV lamp will not break down as this is located in the bottom holding tank with continuous UV lamp exposure.

n. A removable Ozone generator injector that can be used in or out of the unit. While mounted inside the unit the ozone generator is operated by the PCB. A tube which can attach to the front of the Ozone generator while it is still inside the unit of that can be placed into any object desired to inject ozone. The ozone generator is removable and when removed from the unit the ozone generator can operate off of an AC adaptor.

o. large LCD display that background colors of the light are changeable that adjust to a persons personal taste and that are easy viewing for a particular persons sensitive eyes.

p. includes air filters that were custom designed for this unit which include anti virus, anti bacteria agents and also remove suspended pollen or dust particles so that contaminants and undesirable impurities from the environmental air are not carried into the dehydrator, return air vents and water condenser dispenser section.

q. second exhaust fan designed for the sole purpose of adding extra air cooling to the compressor.

r. A portable system that sends dry make up air into the return air part of an A/C system in home or office there by helping the efficiency of the home and office A/C unit lowering utility cost by helping to dry the evaporator coils of the said A/C system therefore sending out drier cool air allowing one to set the thermostat at a higher tempter with the same comfort level as wetter colder settings.

s. Baffle compartment forcing outside air to be drawn in through vented sides and across compressor for needed cooling.

t. Combination porcine, carbon colloidal silver water filters assuring 0 bacteria growth in carbon taste and order filter.

u. Single hand water dispensing levers.

v. All components of entire unit are serviceable by easy access opening compartments. No part of the portable Combination Dehydrator, Dry Return Air and Condensed Water Generator need be disassembled to service any part of the unit.

w. easily changeable water tubing thought entire machine without disassembling any part of the machine.

x. Individual switches allowing the user to choose to have the cold water on or off.

y. Individual switches allowing the user to choose to have the hot water on or off.

Although a particular embodiment of the invention has been disclosed, variations thereof may occur to an artisan and the scope of the invention should only be limited by the scope of the appended claims.

What is claimed is:

1. A system, comprising:
   (a) a housing;
   (b) a heat exchanger mounted in the housing, wherein the heat exchanger includes a condenser;
   (c) an ambient air intake mounted in the housing and configured to draw ambient air across the condenser, wherein the ambient air is converted to dry air;
   (d) a reservoir configured to collect water condensed out of the ambient air by the condenser;
   (e) a dispenser configured to dispense water from the reservoir;
   (f) a sterilizing UV lamp located in the reservoir;
   (g) a tube that wraps around the sterilizing UV lamp and is configured to circulate water close to the sterilizing UV lamp and then within the reservoir;
   (h) a bypass valve that alternately allows water from the reservoir to flow to the dispenser or to a second, external reservoir.

2. The system of claim 1, further comprising a safety switch connected to the sterilizing UV lamp in the system, wherein the safety switch is configured to turn the sterilizing UV lamp off when the UV lamp is exposed for service.

3. The system of claim 1, further comprising a humidistat to determine a measured humidity, the humidistat permitting the heat exchanger and the ambient air intake to operate when the measured humidity is above a threshold humidity level, and the humidistat not permitting the heat exchanger and the ambient air intake to operate when the measured humidity is below the threshold humidity level.

4. The system of claim 1, further comprising a second sterilizing UV lamp located between the air intake and the condenser.

5. The system of claim 1, further comprising a drip tray that is configured to be insertable into and removable from the system as a unit with the reservoir, wherein the drip tray and reservoir are removable from each other when not installed in the system.

6. The system of claim 1, further comprising an ozone generator configured to inject ozone into the reservoir through a stainless steel tube.

7. The system of claim 1, further comprising a self-priming water pump positioned in the reservoir and configured to pump water out of the reservoir.

8. The system of claim 1, further comprising a pump located inside the reservoir, wherein the pump is configured to continually move water inside the reservoir.

9. The system of claim 1, further comprising a stainless steel shaft positioned in the reservoir and configured to hold one or more magnetic float switches for controlling system operation.

10. The system of claim 1, further comprising a stainless steel siphon tube positioned in the reservoir to enable water to be siphoned from the reservoir.

11. The system of claim 10, further comprising a stainless steel shaft positioned in the reservoir and configured to hold one or more magnetic float switches for controlling system operation.

12. The system of claim 1, further comprising a filter comprising a porcelain, a carbon, and a colloidal silver through which water condensed out of the ambient air is filtered.

13. The system of claim 1, wherein the housing is operatively coupled to a return air system to receive the dry air.

14. The system of claim 1, further comprising an alternative source of water that is not condensed from the ambient air, and wherein the dispenser is configured to alternately dispense water either from the reservoir or the alternative source, the dispenser comprising a network of tubing and at least one water valve, the alternative source being a city water line or a container of bottled water.

15. The system of claim 13, wherein the return air system is a dehydration compartment.

16. The system of claim 15, wherein the dehydration compartment is operatively connected to an A/C return air intake.

17. A system, comprising:
    (a) a housing;
    (b) a heat exchanger mounted in the housing, wherein the heat exchanger includes a condenser;
    (c) an ambient air intake mounted in the housing and configured to draw ambient air across the condenser, wherein the ambient air is converted to dry air;
    (d) a reservoir configured to collect water condensed out of the ambient air by the condenser;
    (e) a dispenser configured to dispense water from the reservoir;
    (f) a sterilizing UV lamp located in the reservoir;
    (g) a tube that wraps around the sterilizing UV lamp and is configured to circulate water close to the sterilizing UV lamp and then within the reservoir; and
    (h) a filter comprising a porcelain, a carbon, and a colloidal silver through which water condensed out of the ambient air is filtered.

18. The system of claim 17, further comprising a safety switch connected to the sterilizing UV lamp in the system, wherein the safety switch is configured to turn the sterilizing UV lamp off when the UV lamp is exposed for service.

19. The system of claim 17, further comprising a humidistat to determine a measured humidity, the humidistat permitting the heat exchanger and the ambient air intake to operate when the measured humidity is above a threshold humidity level, and the humidistat not permitting the heat exchanger and the ambient air intake to operate when the measured humidity is below the threshold humidity level.

20. The system of claim 17, further comprising a second sterilizing UV lamp located between the air intake and the condenser.

21. The system of claim 17, further comprising a drip tray that is configured to be insertable into and removable from the system as a unit with the reservoir, wherein the drip tray and reservoir are removable from each other when not installed in the system.

22. The system of claim 17, further comprising an ozone generator configured to inject ozone into the reservoir through a stainless steel tube.

23. The system of claim 17, further comprising a bypass valve that alternately allows water from the reservoir to flow to the dispenser or to a second, external reservoir.

24. The system of claim 17, further comprising a self-priming water pump positioned in the reservoir and configured to pump water out of the reservoir.

25. The system of claim 17, further comprising a pump located inside the reservoir, wherein the pump is configured to continually move water inside the reservoir.

26. The system of claim 17, further comprising a stainless steel shaft positioned in the reservoir and configured to hold one or more magnetic float switches for controlling system operation.

27. The system of claim 17, further comprising a stainless steel siphon tube positioned in the reservoir to enable water to be siphoned from the reservoir.

28. The system of claim 17, further comprising a stainless steel shaft positioned in the reservoir and configured to hold one or more magnetic float switches for controlling system operation.

29. The system of claim 17, wherein the housing is operatively coupled to a return air system to receive the dry air.

30. The system of claim 17, further comprising an alternative source of water that is not condensed from the ambient air, and wherein the dispenser is configured to alternately dispense water either from the reservoir or the alternative source, the dispenser comprising a network of tubing and at least one water valve, the alternative source being a city water line or a container of bottled water.

31. The system of claim 29, wherein the return air system is a dehydration compartment.

32. The system of claim 30, wherein the dehydration compartment is operatively connected to an A/C return air intake.

* * * * *